US012750305B2

(12) United States Patent
Narayanan et al.

(10) Patent No.: US 12,750,305 B2
(45) Date of Patent: Sep. 29, 2026

(54) BGP PEERING STATUS-AWARE HITLESS REBOOT

(71) Applicant: Arista Networks, Inc., Santa Clara, CA (US)

(72) Inventors: Anand Narayanan, Austin, TX (US); Akhil Shashidar, Austin, TX (US); Pavan Narasimhaprasad, Cedar Park, TX (US); Thejesh Panchappa, Newark, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 155 days.

(21) Appl. No.: 18/797,967

(22) Filed: Aug. 8, 2024

(65) Prior Publication Data

US 2026/0046241 A1 Feb. 12, 2026

(51) Int. Cl.

*H04L 45/036* (2022.01)
*H04L 45/00* (2022.01)
*H04L 45/586* (2022.01)
*H04L 45/745* (2022.01)

(52) U.S. Cl.

CPC ............ *H04L 45/22* (2013.01); *H04L 45/036* (2022.05); *H04L 45/586* (2013.01); *H04L 45/745* (2013.01)

(58) Field of Classification Search

CPC ..... H04L 45/22; H04L 45/036; H04L 45/586; H04L 45/745

See application file for complete search history.

(56) References Cited

U.S. PATENT DOCUMENTS

2005/0177634 A1* 8/2005 Scudder .................. H04L 45/22 709/225
2017/0318087 A1* 11/2017 Qiu ..................... H04L 41/0895

* cited by examiner

*Primary Examiner* — Soe Hlaing
(74) *Attorney, Agent, or Firm* — Fountainhead Law Group, PC

(57) ABSTRACT

Techniques for implementing Border Gateway Protocol (BGP) peering status-aware hitless reboot on a network device are provided. In one set of embodiments, at the time of shutting down for a hitless reboot, the network device can collect status information regarding its BGP peerings and can write this information to a file on non-volatile storage. Then, upon booting up after the hitless reboot, the network device can retrieve the file from the non-volatile storage and use the status information included therein to restore the BGP peerings as they existed prior to the hitless reboot.

18 Claims, 7 Drawing Sheets

BGP PEERING STATUS-AWARE HITLESS REBOOT

BACKGROUND

A hitless reboot of a network device is a procedure that involves restarting the network device's control plane while keeping its data/forwarding plane operational. This allows the network device to be upgraded with a new software image, or rebooted into the same software image, without interrupting the flow of network traffic through the device.

One type of networking protocol that may run on a network device's control plane is Border Gateway Protocol (BGP). BGP allows BGP-enabled network devices, known as BGP speakers, to exchange reachability (routing) information for Internet Protocol (IP) prefixes with each other. BGP speakers that engage in a mutual exchange of reachability information via BGP are referred to as BGP peers (or simply peers) and the peer relationship between two BGP peers is referred to as a BGP peering (or simply peering). Generally speaking, the peers/peerings of a given BGP speaker are defined in a peer configuration that is maintained on that BGP speaker.

When a BGP speaker undergoes a hitless reboot, the BGP speaker needs to reconcile its BGP protocol state (e.g., stored routes for IP prefixes) with its peers upon being restarted. Currently, the reconciliation process (also known as convergence) is driven by the peer configuration present on the restarting BGP speaker. However, in some cases this peer configuration may not accurately reflect the active (or in other words, established) peerings of the restarting BGP speaker at the time it is rebooted. This can lead to convergence delays and/or other issues.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

Embodiments of the present disclosure are directed to techniques for implementing hitless reboot on a BGP-enabled network device (i.e., BGP speaker) in a manner that is aware of the statuses of the BGP speaker's peerings at the time of the hitless reboot. As explained below, in certain embodiments these techniques can significantly reduce the time needed for the BGP speaker to complete the convergence process after being restarted.

1. Example Network and Problem Description

Figure 1:
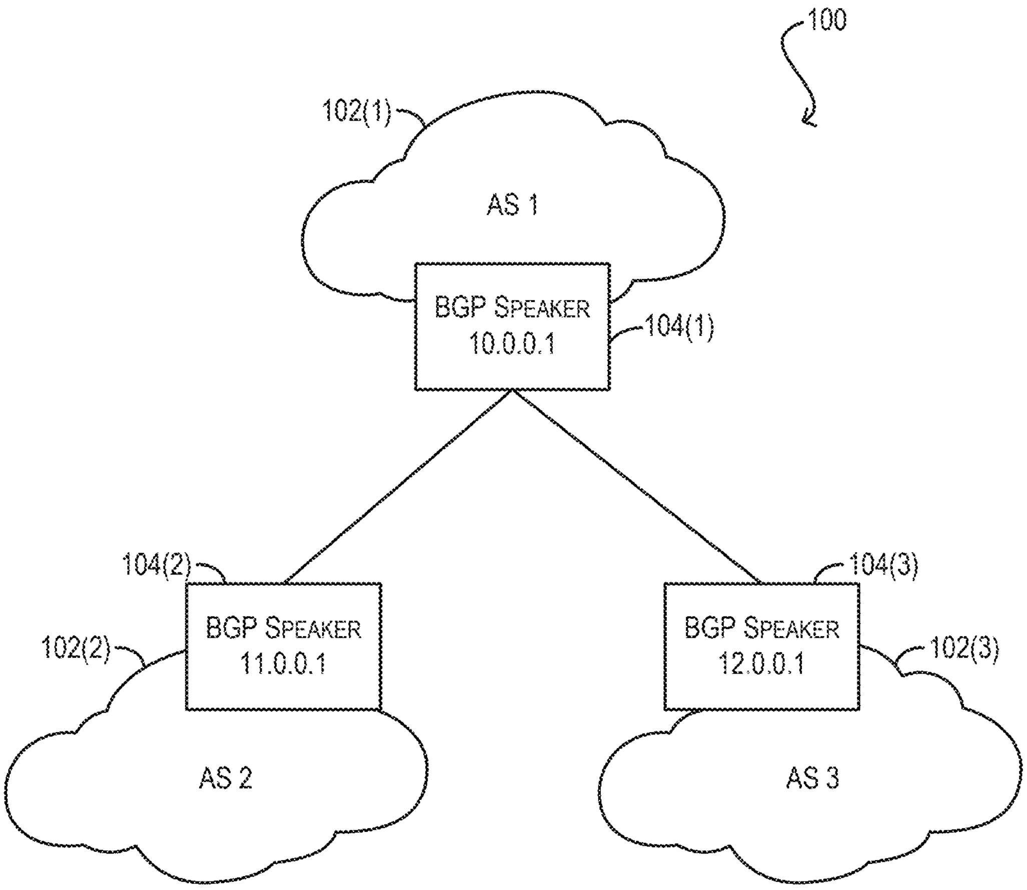
FIG. 1 depicts an example network in accordance with certain embodiments of the present disclosure.

FIG. 1 is a simplified block diagram of an example network 100 in which the techniques of the present disclosure may be implemented. As shown, network 100 includes a first autonomous system (AS) 1 (reference numeral 102(1)) comprising a first BGP speaker 104(1) having the IP address 10.0.0.1, a second AS 2 (reference numeral 102(2)) comprising a second BGP speaker 104(2) having the IP address 11.0.0.1, and a third AS 3 (reference numeral 102(3)) comprising a third BGP speaker 104(3) having the IP address 12.0.0.1. BGP speaker 104(1) is connected to BGP speakers 104(2) and 104(3) respectively. Each AS 1/2/3 is a collection of IP networks that are managed and controlled by an entity (e.g., an internet service provider (ISP) or an enterprise) with a single routing policy. This routing policy dictates how network routes are managed within the autonomous system and are advertised to other autonomous systems. Each BGP speaker 104 is a network device (e.g., a switch or router) that runs the BGP protocol and uses BGP to provide reachability information for IP prefixes it has learned to other BGP speakers (peers), which may reside in the same or different autonomous systems.

Figure 2:
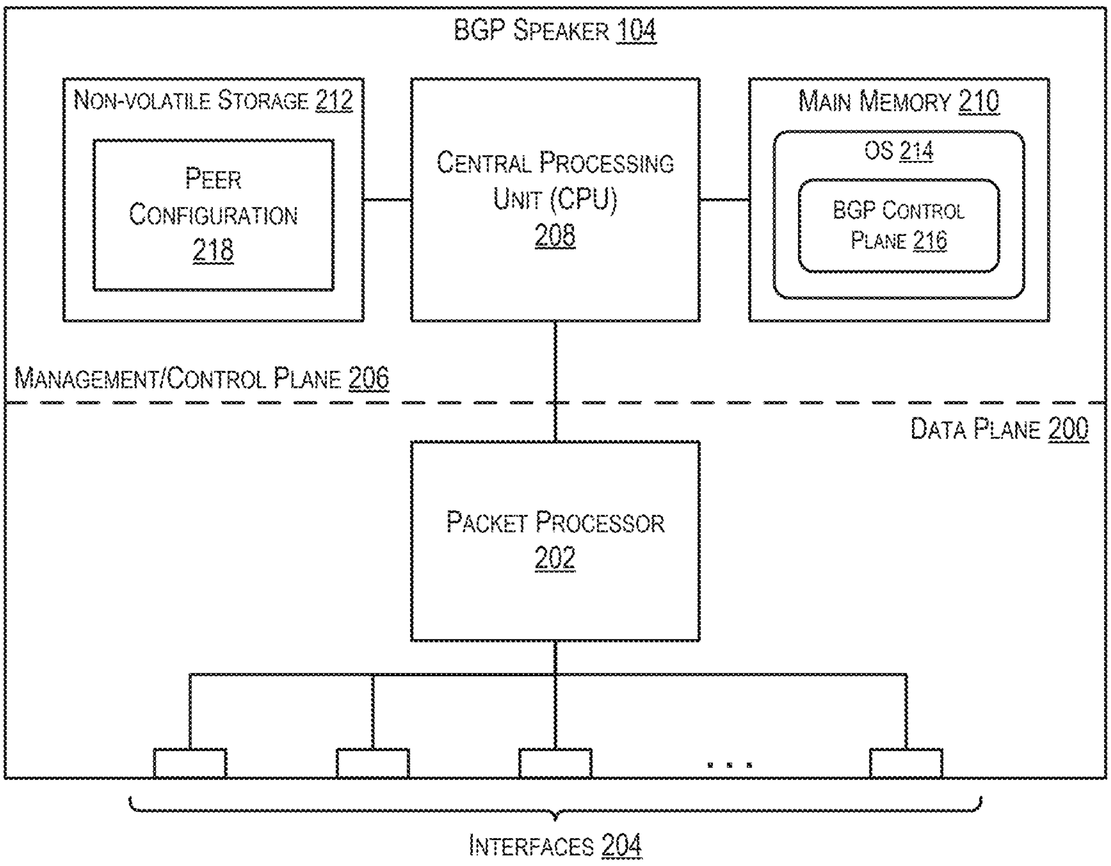
FIG. 2 depicts an example BGP speaker in accordance with certain embodiments of the present disclosure.

FIG. 2 is a simplified block diagram of each BGP speaker 104 of network 100 according to certain embodiments. As shown in FIG. 2, BGP speaker 104 includes a data (or forwarding) plane 200 comprising a packet processor 202 and a set of front-panel interfaces (ports) 204. Packet processor 202 is an integrated circuit, such as an application-specific integrated circuit (ASIC) or field-programmable gate array (FPGA), that is responsible for performing line-speed processing of network packets (i.e., traffic) that pass through BGP speaker 104 via interfaces 204. This line-speed processing can include, for example, Layer 3 (L3) routing of IP traffic.

BGP speaker 104 also includes a management/control plane 206 comprising a central processing unit (CPU) 208, a main memory 210, and a non-volatile (e.g., flash) storage 212. CPU 208 is a general-purpose processor that is responsible for managing the configuration/operation of BGP speaker 104 and controlling the device's understanding of the network in which it resides. CPU 208 carries out these functions under the direction of an operating system (OS) 214 that runs on CPU 208 from main memory 210.

Because BGP speaker 104 is a BGP-enabled network device, OS 214 includes BGP control plane software (hereinafter simply BGP control plane) 216 that allows BGP speaker 104 to exchange routing information with other BGP speakers (peers) via the BGP protocol. The peers/peerings of BGP speaker 104 are defined in a peer configuration 218 that is maintained in non-volatile storage 212. This peer configuration is typically specified/created by a user or administrator of BGP speaker 104. Generally speaking, BGP control plane 216 uses peer configuration 218 to determine who the configured peers of BGP speaker 104 are and establish BGP sessions with those configured peers as needed.

By way of example, the following table depicts sample entries that may be stored in the peer configuration of BGP speaker 104(1) of FIG. 1. It should be appreciated that these entries are illustrative and may be formatted differently and/or include additional attributes on different makes/models of BGP speaker devices.

TABLE 1

| Peer type | IP address (or subnet) | Autonomous system number |
|---|---|---|
| Static | 11.0.0.1 | 2 |
| Dynamic | 12.0.0.0/24 | 3 |

As shown in this example, the peer configuration of BGP speaker 104(1) defines two peerings: a first "static" peering between BGP speaker 104(1) and a BGP speaker that has the IP address 11.0.0.1 and is part of AS 2 (i.e., BGP speaker 104(2)), and a second "dynamic" peering between BGP speaker 104(1) and a set of BGP speakers that have an IP address within the subnet 12.0.0.0/24 and are part of AS 3 (e.g., BGP speaker 104(3)). The first peering is static because it explicitly identifies the IP address of that peer. In contrast, the second peering is dynamic because it identifies a subnet, or range, of IP addresses of possible peers, rather than the IP address of a specific peer.

With this peer configuration in place, at the time of device startup/initialization, BGP control plane 216 of BGP speaker 104(1) will attempt to establish a BGP session (which operates on top of a Transport Control Protocol (TCP) connection) with BGP speaker 104(2) because it is defined as a static peer of BGP speaker 104(1) per the first peer configuration entry above. Upon establishing this BGP session, BGP speaker 104(1) will be able to exchange routing information with BGP speaker 104(2) via BGP. Further, BGP control plane 216 of BGP speaker 104(1) will listen for TCP connection requests from BGP speakers in AS 3 that have an IP address in the subnet 12.0.0.0/24, per the second (dynamic) peer configuration entry above. Upon receiving a TCP connection request from a dynamic peer that meets these criteria (such as, e.g., BGP speaker 104(3)), BGP control plane 216 of BGP speaker 104(1) will establish a BGP session with that dynamic peer, thereby enabling BGP speaker 104(1) to exchange routing information with the peer via BGP.

Figure 3:
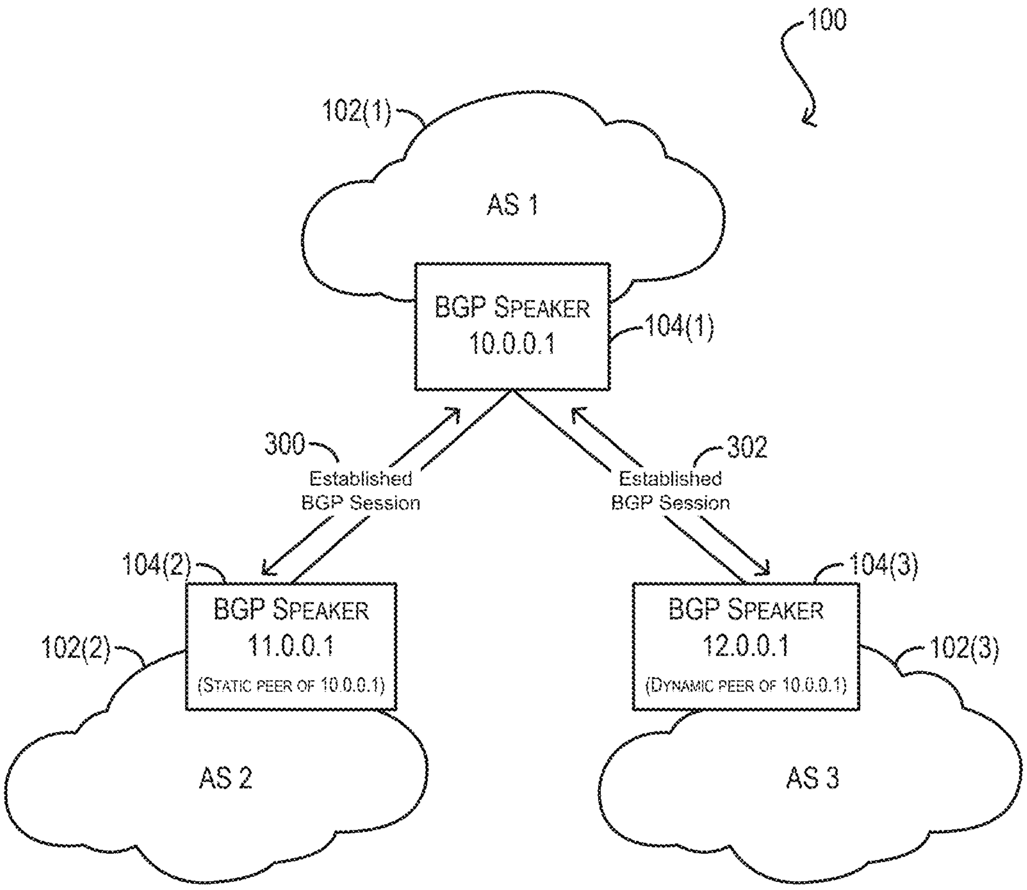
FIG. 3 depicts an example scenario with respect to the network of FIG. 1 in accordance with certain embodiments of the present disclosure.

For example, FIG. 3 depicts a steady state scenario for network 100 of FIG. 1 in which BGP speaker 104(1) has established a first BGP session 300 with BGP speaker 104(2) (where BGP speaker 104(2) is a static peer) and has established a second BGP session 302 with BGP speaker 104(3) (where BGP speaker 104(3) is a dynamic peer). In this scenario, the peerings between BGP speaker 104(1) and BGP speakers 104(2) and 104(3) respectively have a status of "established" because the BGP sessions between each of those peer pairs are active/established.

As mentioned in the Background section, when a BGP speaker undergoes a hitless reboot, it needs to carry out a convergence process upon being restarted in order to reconcile its BGP protocol state with its peers and thus ensure that it has the latest/correct routing information. This convergence process is facilitated via an existing BGP mechanism known as Graceful Restart (GR). In GR, the restarting BGP speaker is called the GR restarter and its peers are called GR helpers. GR generally works as follows:

1. At the time the GR restarter goes offline due to being rebooted, each GR helper determines that its TCP connection to the GR restarter has been lost and starts a GR timer. While this timer's elapsed time remains below a GR timeout value, the GR helper attempts to reconnect to the GR restarter while maintaining in its local routing information base (RIB) the routes previously sent (i.e., advertised) by the GR restarter. In particular, each GR helper sends TCP connection requests to the GR restarter, typically with an exponential backoff so that the transmission of each successive connection request is delayed according to an exponential curve (to avoid congesting the network). If the GR helper is unable to establish a TCP connection (and consequently, a BGP session) with the GR restarter within the GR timeout, the GR helper assumes that the GR restarter will remain offline for an unknown period of time and purges the GR restarter's routes from its RIB.
2. During bootup, the GR restarter refers to its peer configuration to identify the BGP peers/peerings that are configured on the device. For each static peer defined in the peer configuration (i.e., a peer with an explicit IP address), the GR restarter attempts to connect to that static peer by sending a TCP connection request to the peer's specified IP address. If the static peer is available/online, it responds to the connection request (thereby allowing for the establishment of a BGP session over the TCP connection), sends the contents of its RIB to the GR restarter, and then sends an end-of-RIB (EoR) signal to the GR restarter (which indicates that its entire RIB has been sent). If the static peer does not respond to the connection request, the GR restarter continues to send connection requests to that static peer until the peer responds or until an idle peer timeout is reached.
3. Upon (a) expiration of the idle peer timeout interval for peers that did not respond to the connection requests and (b) receiving EoR signals from peers that did respond to the connection requests, the GR restarter executes a best path computation that involves selecting the best routes for the IP prefixes it is aware of based on the received RIB information. The GR restarter then updates its local RIB and forwarding information base (FIB) accordingly and advertises the best routes to its peers as needed. At this point, the convergence process is considered complete from the GR restarter's perspective and the GR restarter can thereafter resume normal operation.

While this existing GR mechanism is mostly functional, it suffers from a couple of problems. First, as noted above, the GR restarter only attempts to connect to static peers defined in its peer configuration upon bootup. The GR restarter does not attempt to connect any previously-established dynamic peers because it does not know their specific IP addresses after reboot and thus cannot send connection requests to them. Instead, the GR restarter relies on the fact that such dynamic peers will attempt to reconnect from their side, per standard GR helper functionality. However, because GR helpers typically apply an exponential backoff to the timing of their connection requests, it is possible that a dynamic peer will be unable to establish a connection to the GR restarter before the dynamic peer's GR timeout interval expires. In this case, the dynamic peer will flush all of the routes it previously received from the GR restarter, thereby triggering a costly reconvergence process at that peer.

Figure 4:
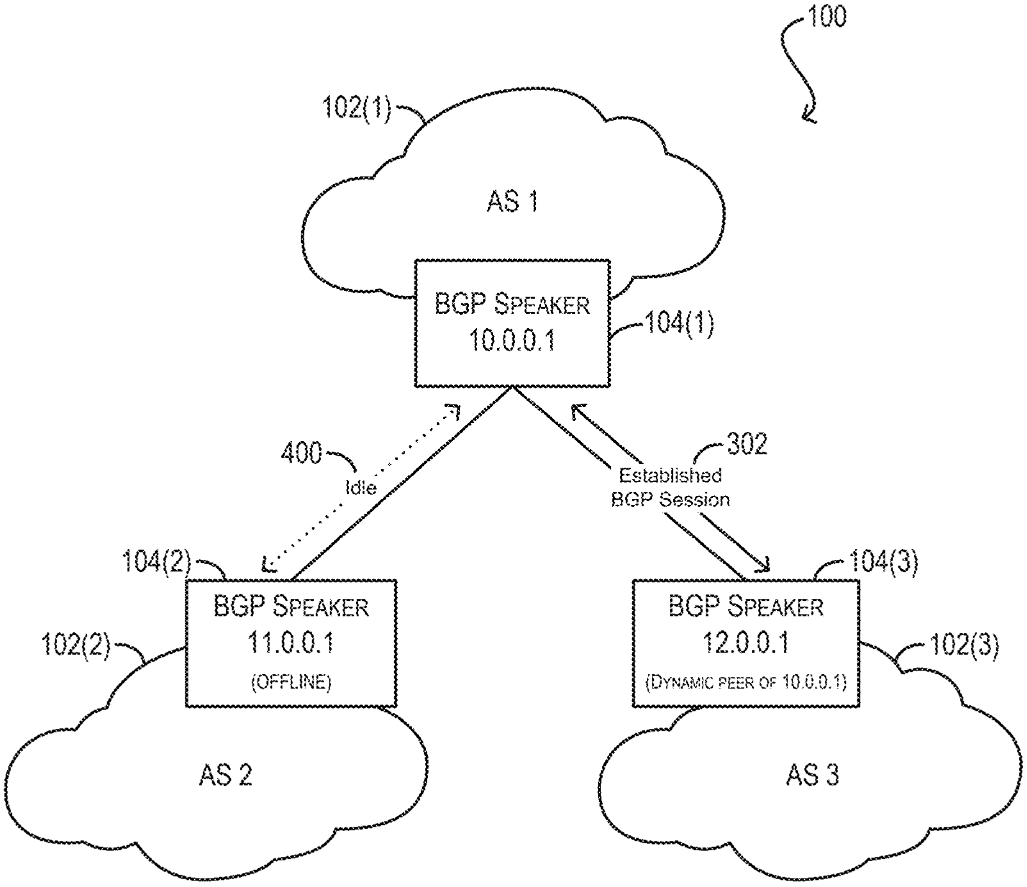
FIG. 4 depicts another example scenario with respect to the network of FIG. 1 in accordance with certain embodiments of the present disclosure.

Second, some of the static peers/peerings defined in the GR restarter's peer configuration may be in an "idle" status at the time of the hitless reboot, which means that those static peers do not have an established BGP session with the GR restarter. There are several possible reasons for this; for instance, those static peers may have gone offline for planned maintenance or due to an unanticipated error/failure. By way of example, FIG. 4 depicts a scenario for network 100 of FIG. 1 where BGP speaker 104(2) has gone down, which causes the BGP session/peering status between BGP speakers 104(1) and 104(2) to become idle (reference numeral 400). In this type of scenario, the idle static peers will likely still be idle (or in other words, unreachable) once the GR restarter has rebooted. However, the GR restarter will nonetheless attempt to connect to the idle static peers during its bootup process because they are defined in the GR restarter's peer configuration, which will cause the GR restarter to resend connection requests to those peers until the idle peer timeout is reached. This is undesirable as it unnecessarily delays the GR restarter's convergence process.

Such a convergence delay is particularly problematic in a layered BGP deployment where the convergence of one network address family depends on another. For example, consider a deployment in which overlay (e.g., Ethernet Virtual Private Network or EVPN) BGP peerings are established over underlay (e.g., IP version 4 or IPv4) routes. In this type of deployment, if the GR restarter has both EVPN and IPv4 peers, it will carry out the convergence process with respect to its IPv4 peers first, and then move onto convergence processing with respect to its EVPN peers. This sequential approach means that an idle peer timeout for any of the IPv4 peers will prevent convergence of the entire EVPN address family, resulting in a significant impact on EVPN traffic.

2. Solution Overview

Figure 5:
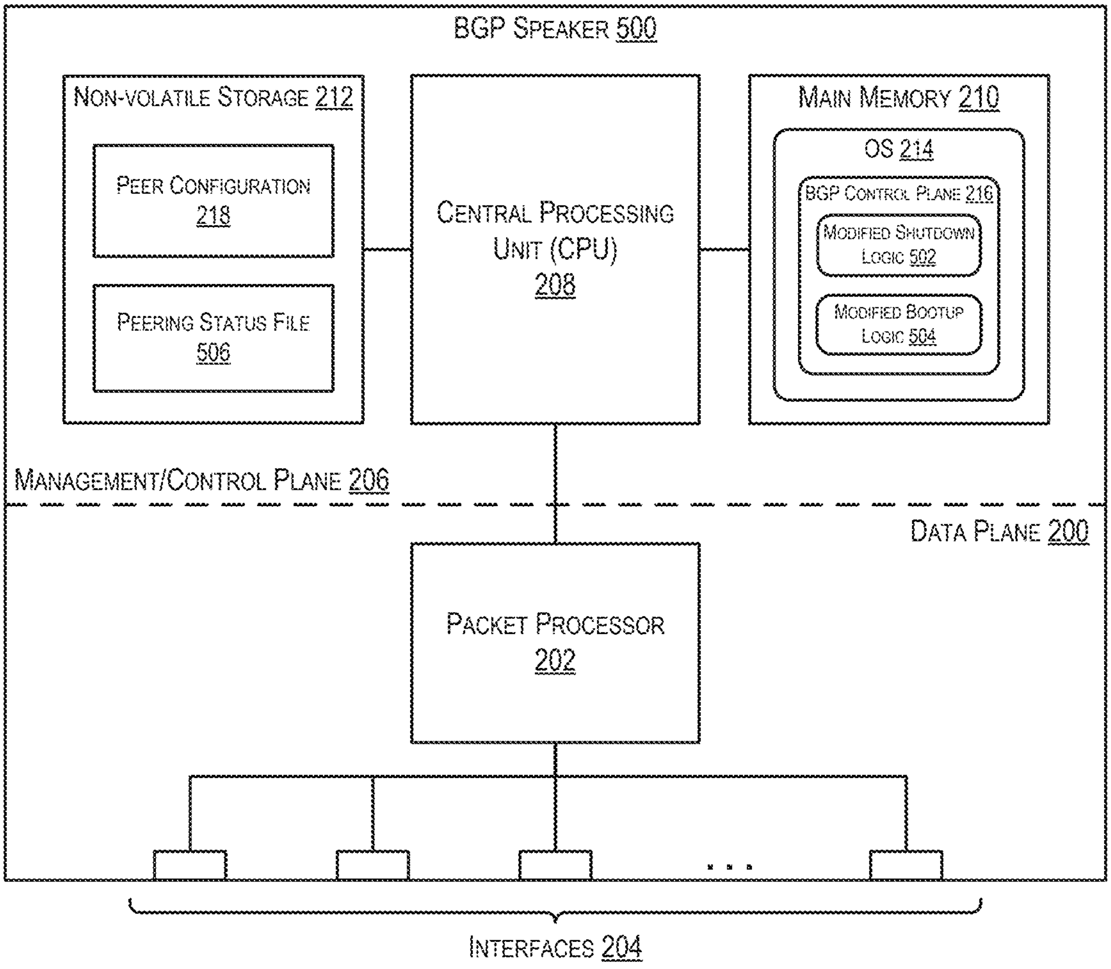
FIG. 5 depicts a BGP speaker that supports BGP peering status-aware hitless reboot in accordance with certain embodiments of the present disclosure.

To address the foregoing and other similar or related problems, FIG. 5 depicts an enhanced version 500 of BGP speaker 104 of FIG. 2 according to certain embodiments. As shown, BGP speaker 500 includes modified shutdown and bootup processing logic components 502 and 504 within BGP control plane 216, as well as a new peering status file 506 that is maintained on non-volatile storage 212.

At a high level, new/modified components 502-506 enable BGP speaker 500 to implement hitless reboot in a manner that is aware of and takes into account the statuses of its BGP peers/peerings at the time of the hitless reboot, thereby avoiding the problems noted above. For example, when a hitless reboot is initiated on BGP speaker 500, BGP speaker 500 can collect, via modified shutdown processing logic 502, status information for its peers and can write/persist the collected status information to peering status file 506 on non-volatile storage 212. More specifically, BGP speaker 500 can collect this status information for every static peer defined in its peer configuration 218 and for every dynamic peer that is in communication (i.e., has an established BGP session) with BGP speaker 500.

In certain embodiments the status information collected and written to peering status file 506 can include, for each such peer P, the IP address of P, the IP virtual routing and forwarding (VRF) instance of P, an identifier (ID) of the interface on BGP speaker 500 that connects to P, and a current peering status of P (e.g., established or idle). If peer P communicates with BGP speaker 500 in the context of multiple different network address families, the status information can also include one or more per-address family peering statuses for P (referred to as per-address family identifier (AFI)-subsequent address family (SAFI) peering statuses).

Then, when BGP speaker 500 restarts after the hitless reboot, BGP speaker 500 can attempt, via modified bootup processing logic 504, to reconnect to each peer listed in peering status file 506, rather than to each peer listed in peer configuration 218. This approach has two advantages: first, because peering status file 506 includes the specific IP addresses of the dynamic peers that BGP speaker 500 was in communication with immediately prior to the hitless reboot, BGP speaker 500 can directly send a TCP connection request to those dynamic peers. In other words, BGP speaker 500 does not need to wait for the dynamic peers to initiate a connection from their end as per the conventional GR workflow (which may not result in a successful connection as explained above).

Second, because peering status file 506 contains the peering status (e.g., established or idle) of each peer immediately prior to the hitless reboot, BGP speaker 500 does not need to wait for the idle peer timeout interval to expire for idle (static) peers before proceeding to best path computation. Instead, BGP speaker 500 can immediately move on to computing best paths/routes from a given address family upon receiving EoR signals from all established peers of that address family (according to the status information included in peering status file 506). This significantly accelerates the convergence process, which is particularly beneficial in layered deployments where the convergence of one address family is gated by the convergence of another.

To provide a concrete example of the foregoing solution, assume BGP speaker 104(1) of network 100 implements the new/modified components shown in FIG. 5 and undergoes a hitless reboot in the context of the network scenario of FIG. 4. In this case, as part of its shutdown processing, BGP speaker 104(1) will collect peering status information for BGP speaker 104(2) (which is a static peer in accordance with the peer configuration presented in Table 1 above) and for BGP speaker 104(3) (which is a dynamic peer that is in communication with BGP speaker 104(1)) and will persist this information to a peering status file on its non-volatile storage. The collected/persisted status information will include, among other things, an IP address and a peering status of "idle" for BGP speaker 104(2) (because there is no established BGP session between BGP speaker 104(2) and BGP speaker 104(1) in FIG. 4). Further, the collected/persisted status information will include, among other things, an IP address and a peering status of "established" for BGP speaker 104(3) (because there is an established BGP session between BGP speaker 104(3) and BGP speaker 104(1) in FIG. 4).

For example, the following table presents sample entries for BGP speakers 104(2) and 104(3) in the peering status file (note that these entries are simplified and do include other potential attributes mentioned previously such as VRF ID, interface ID, etc.):

TABLE 2

| Peer IP Address | Peering Status |
|---|---|
| 11.0.0.1 | Idle |
| 12.0.0.1 | Established |

Then, as part of its bootup processing, BGP speaker 104(1) will retrieve the peering status file from its non-volatile storage, identify BGP speaker 104(3) as being listed therein, and send a TCP connection request to the specified IP address of BGP speaker 104(3) in order to establish a BGP session with that speaker. Because BGP speaker 104(3) has a status of "established" in the peering status file (which indicates that it was active immediately prior to the hitless reboot), if BGP speaker 104(3) does not respond to the connection request, BGP speaker 104(1) will retry the request until the idle peer timeout interval has expired.

In addition, BGP speaker 104(1) will identify BGP speaker 104(2) as being listed in the peering status file and send a TCP connection request to the specified IP address of BGP speaker 104(2) in order to establish a BGP session with that speaker. Because BGP speaker 104(2) has a status of "idle" in the peering status file (which indicates that it was inactive/unreachable immediately prior to the hitless reboot), if BGP speaker 104(2) does not respond to the connection request, BGP speaker 104(1) will not retry the request until the idle peer timeout interval has expired; instead, BGP speaker 104(1) will immediately move on to best path computation upon receiving EoR signals from the other peers (i.e., BGP speaker 104(3)).

The remaining sections of this disclosure provide additional details regarding the modified shutdown and bootup processing that may be performed by a BGP speaker using new/modified components 502-506 shown in FIG. 5 according to various embodiments. It should be appreciated that FIGS. 1-5 and the foregoing high-level solution description are illustrative and not intended to limit embodiments of the present disclosure. For example, although FIG. 5 depict a particular arrangement of components in BGP speaker 500, other arrangements are possible (e.g., the functionality attributed to a particular component may be split into multiple components, components may be combined, etc.). One of ordinary skill in the art will recognize other similar modifications, variations, and alternatives.

3. Shutdown Processing

Figure 6:
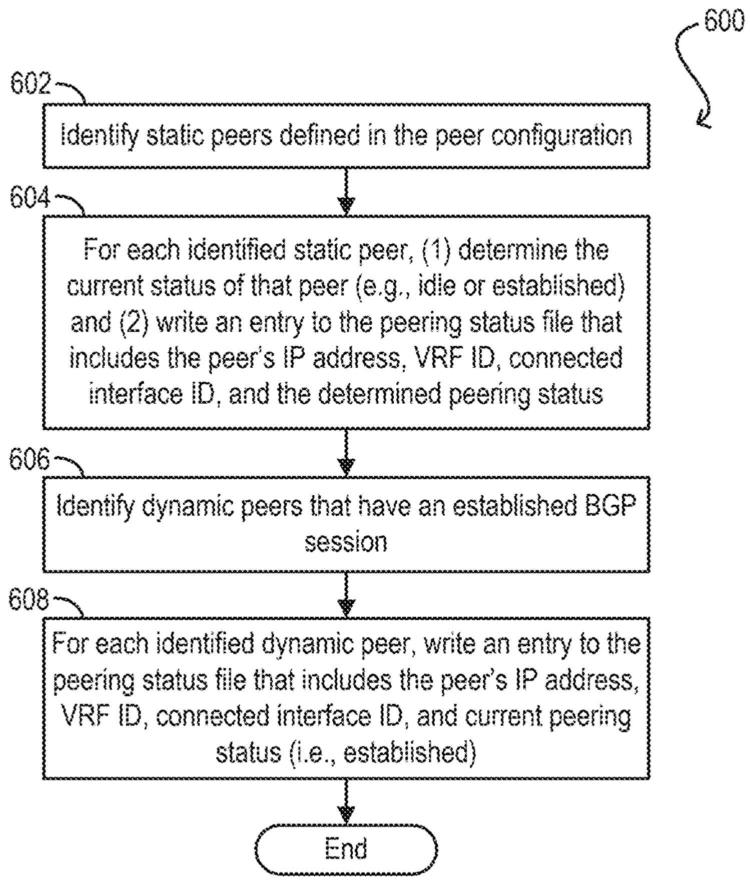
FIG. 6 depicts a shutdown processing workflow that may be performed by the BGP speaker of FIG. 5 in accordance with certain embodiments of the present disclosure.

FIG. 6 depicts a workflow 600 of the modified shutdown processing that may be executed by BGP speaker 500 of FIG. 5 (or more precisely, by a process of its BGP control plane 216) in accordance with modified shutdown processing logic 502 per certain embodiments. BGP speaker 500 can carry out the steps of workflow 600 in response to receiving a hitless reboot request/command and prior to tearing down the TCP connections between itself and its established BGP peers.

Starting with step 602, BGP speaker 500 can identify the static peers defined in its peer configuration 218. As mentioned previously, these static peers are those that are associated with an explicit IP address in the peer configuration.

For each static peer identified at 602, BGP speaker 500 can (1) determine the current status of that peer (e.g., idle or established) and (2) write an entry to peering status file 506 that includes, among other things, the IP address of the static peer, the VRF ID of the static peer (which qualifies the IP address), the interface ID associated with the static peer (which identifies the interface of BGP speaker 500 connected to that static peer), and the determined peering status (step 604). If the static peer communicates with BGP speaker 500 in the context of different network address families, the entry can also include per-AFI-SAFI peering statuses for the static peer (which indicate the peer's current status per address family).

At step 606, BGP speaker 500 can identify the dynamic peers that it is currently communicating with, or in other words the dynamic peers that currently have an established BGP session with BGP speaker 500.

Finally, for each dynamic peer identified at 606, BGP speaker 500 can write an entry to peering status file 506 that includes, among other things, the IP address of the dynamic peer, the VRF ID of the dynamic peer (which qualifies the IP address), the interface ID associated with the dynamic peer (which identifies the interface of BGP speaker 500 connected to that dynamic peer), and the dynamic peer's current peering status (i.e., established) (step 608). As with the static peers, if the dynamic peer communicates with BGP speaker 500 in the context of different network address families, the entry can also include per-AFI-SAFI peering statuses for the dynamic peer (which indicate the peer's current status per address family).

4. Bootup Processing

Figure 7:
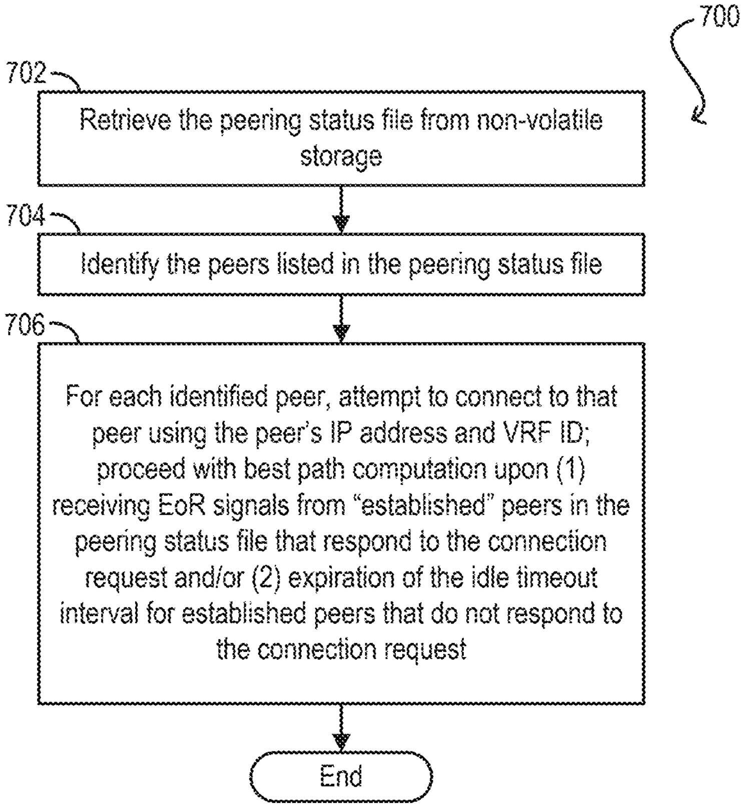
FIG. 7 depicts a bootup processing workflow that may be performed by the BGP speaker of FIG. 5 in accordance with certain embodiments of the present disclosure.

FIG. 7 depicts a workflow 700 of the modified bootup processing that may be executed by BGP speaker 500 of FIG. 5 (or more precisely, by a process of its BGP control plane 216) in accordance with modified bootup processing logic 504 per certain embodiments. Workflow 700 is performed at the time BGP speaker 500 is restarted as part of a hitless reboot and assumes that the BGP speaker's peering status file 506 includes the peering status information written via shutdown processing workflow 600 of FIG. 6. In the case where peering status file 506 includes peering status information for peers that are members of different network address families, workflow 700 can be performed on a per-address family basis and thus can be repeated for each such address family.

Starting with step 702, BGP speaker 500 can retrieve peering status file 506 from its non-volatile storage 212.

At step 704, BGP speaker 500 can identify the peers listed in peering status file 506, which includes all of the static peers defined in peer configuration 218 and all of the dynamic peers that were in an established state at the time BGP speaker 500 was shut down for the hitless reboot.

Finally, for each peer identified at 704, BGP speaker 500 can attempt to connect to that peer by sending a connection request to the peer using the peer's IP address and VRF ID specified in peering status file 506 (step 706). BGP speaker 500 can proceed with best path computation immediately upon (1) receiving EoR signals from all peers that have a status of "established" in peering status file 506 (i.e., established peers) that respond to the connection request and/or (2) expiration of the idle timeout interval for established peers that that do not respond to the connection request. This means that, for example, if BGP speaker 500 receives EoR signals from all established peers before the idle peer timeout interval has expired for an idle peer, the BGP speaker will proceed with best path computation at that point without waiting for the idle peer timeout to expire with respect to the idle peer.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method performed by a network device for implementing a hitless reboot, the method comprising:

at a time of shutting down the network device:

identifying one or more Border Gateway Protocol (BGP) static peers defined in a peer configuration of the network device;

for each identified BGP static peer, writing a first entry to a peering status file maintained on a non-volatile storage of the network device, the first entry including an Internet Protocol (IP) address of the identified BGP static peer and a current peering status of the identified BGP static peer;

identifying one or more BGP dynamic peers that have an established BGP session with the network device; and for each identified BGP dynamic peer, writing a second entry to the peering status file, the second entry including an IP address of the identified BGP dynamic peer and a current peering status of the identified BGP dynamic peer; and at a time of booting up the network device:

retrieving the peering status file from the non-volatile storage;

identifying one or more BGP peers of the network device listed in the peering status file; and for each identified BGP peer, sending a connection request to the identified BGP peer using the IP address specified for the identified BGP peer in the peering status file.

2. The method of claim 1 wherein the IP address of the identified BGP static peer is included in the peer configuration.

3. The method of claim 1 wherein the IP address of the identified BGP dynamic peer is not included in the peer configuration.

4. The method of claim 1 wherein the first entry further includes a virtual routing and forwarding (VRF) identifier of the identified static peer and an interface identifier identifying an interface of the network device to which the identified static peer is connected.

5. The method of claim 1 wherein the current peering status of the identified BGP static peer in the first entry is set to a first value if the identified BGP static peer has an established BGP session with the network device, and wherein the current peering status of the identified BGP static peer in the first entry is set to a second value if the identified BGP static peer does not have an established BGP session with the network device.

6. The method of claim 5 wherein the current peering status of the identified BGP dynamic peer in the second entry is set to the first value.

7. The method of claim 1 wherein the identified BGP peers include a first subset of peers whose current peering status in the peering status file is the first value and a second subset of peers whose current peering status in the peering status file is the second value.

8. The method of claim 7 wherein the network device proceeds with a best path computation upon receiving End-of-RIB (EoR) signals from each BGP peer in the first subset of peers that responds to the connection request and/or upon expiration of a timeout interval with respect to each BGP peer in the first subset of peers that does not respond to the connection request.

9. A network device comprising:

a central processing unit (CPU);

a non-volatile storage; and a main memory having stored thereon program code that, when executed by the CPU, causes the CPU to:

at a time of shutting down the network device:

identify one or more Border Gateway Protocol (BGP) static peers defined in a peer configuration of the network device;

for each identified BGP static peer, write a first entry to a peering status file maintained on the non-volatile storage, the first entry including an Internet Protocol (IP) address of the identified BGP static peer and a current peering status of the identified BGP static peer;

identify one or more BGP dynamic peers that have an established BGP session with the network device; and for each identified BGP dynamic peer, write a second entry to the peering status file, the second entry including an IP address of the identified BGP dynamic peer and a current peering status of the identified BGP dynamic peer; and at a time of booting up the network device:

retrieve the peering status file from the non-volatile storage;

identify one or more BGP peers of the network device listed in the peering status file; and for each identified BGP peer, send a connection request to the identified BGP peer using the IP address specified for the identified BGP peer in the peering status file.

10. The network device of claim 9 wherein the IP address of the identified BGP static peer is included in the peer configuration.

11. The network device of claim 9 wherein the IP address of the identified BGP dynamic peer is not included in the peer configuration.

12. The network device of claim 9 wherein the first entry further includes a virtual routing and forwarding (VRF) identifier of the identified static peer and an interface identifier identifying an interface of the network device to which the identified static peer is connected.

13. The network device of claim 9 wherein the current peering status of the identified BGP static peer in the first entry is set to a first value if the identified BGP static peer has an established BGP session with the network device, and wherein the current peering status of the identified BGP static peer in the first entry is set to a second value if the identified BGP static peer does not have an established BGP session with the network device.

14. The network device of claim 13 wherein the current peering status of the identified BGP dynamic peer in the second entry is set to the first value.

15. The network device of claim 9 wherein the identified BGP peers include a first subset of peers whose current peering status in the peering status file is the first value and a second subset of peers whose current peering status in the peering status file is the second value.

16. The network device of claim 15 wherein the CPU proceeds with a best path computation upon receiving End-of-RIB (EoR) signals from each BGP peer in the first subset of peers that responds to the connection request and/or upon expiration of a timeout interval with respect to each BGP peer in the first subset of peers that does not respond to the connection request.

17. A method performed by a network device for implementing a hitless reboot, the method comprising:

at a time of shutting down the network device:

identifying one or more Border Gateway Protocol (BGP) static peers defined in a peer configuration of the network device; and for each identified BGP static peer, writing a first entry to a peering status file maintained on a non-volatile storage of the network device, the first entry including an Internet Protocol (IP) address of the identified BGP static peer and a current peering status of the identified BGP static peer; and at a time of booting up the network device:

retrieving the peering status file from the non-volatile storage;

identifying one or more BGP peers of the network device listed in the peering status file; and for each identified BGP peer, sending a connection request to the identified BGP peer using the IP address specified for the identified BGP peer in the peering status file.

18. The method of claim 17 further comprising:

identifying one or more BGP dynamic peers that have an established BGP session with the network device; and for each identified BGP dynamic peer, writing a second entry to the peering status file, the second entry including an IP address of the identified BGP dynamic peer and a current peering status of the identified BGP dynamic peer.

* * * * *